(12) United States Patent
Vermaat

(10) Patent No.: US 7,540,401 B2
(45) Date of Patent: *Jun. 2, 2009

(54) METHOD AND DEVICE FOR WELDING PIPES

(75) Inventor: Pieter Huibrecht Vermaat, Rockanje (NL)

(73) Assignee: Vermaat Technics B.V., Rockanje (NL)

( * ) Notice: Subject to any disclaimer, the term of this patent is extended or adjusted under 35 U.S.C. 154(b) by 521 days.

This patent is subject to a terminal disclaimer.

(21) Appl. No.: 10/995,918

(22) Filed: Nov. 23, 2004

(65) Prior Publication Data

US 2005/0087586 A1    Apr. 28, 2005

Related U.S. Application Data

(63) Continuation of application No. 10/138,024, filed on May 2, 2002, now Pat. No. 6,840,433, which is a continuation of application No. PCT/NL00/00792, filed on Nov. 1, 2000.

(30) Foreign Application Priority Data

Nov. 3, 1999    (NL) .................................... 1013477

(51) Int. Cl.
*B23K 5/08*    (2006.01)
(52) U.S. Cl. ...................... 228/212; 228/44.5; 228/49.3
(58) Field of Classification Search ................. 228/212, 228/213, 29, 44.3, 44.5, 49.1, 49.3; 219/125.11, 219/60 A, 59.1; 29/464
See application file for complete search history.

(56) References Cited

U.S. PATENT DOCUMENTS

| 2,167,887 A | | 8/1939 | Graham et al. | |
|---|---|---|---|---|
| 2,463,907 A | | 3/1949 | Risley et al. | |
| 2,960,597 A | | 11/1960 | Bruno et al. | |
| 3,256,418 A | * | 6/1966 | Bauer et al. | ............... 219/60 R |
| 3,933,292 A | | 1/1976 | Martin | |

(Continued)

FOREIGN PATENT DOCUMENTS

DE    3937094    5/1990

(Continued)

OTHER PUBLICATIONS

English Abstract of JP 61078596, dated Apr. 22, 1986.

(Continued)

*Primary Examiner*—Jessica L Ward
*Assistant Examiner*—Michael Aboagye
(74) *Attorney, Agent, or Firm*—Ladas & Parry LLP

(57) ABSTRACT

Method for welding piped (2, 3) to each other, in which the outer side of the one pipe is engaged tightly with the help of first clamping means and the outer side of the other pipe is engaged tightly with the help of second clamping means in which the first and second clamping means are kept in the line and with their ends close to or against each other by means of a rigid frame on which both clamping means are arranged, after which welding means are operated in order to make a welding seam from the outside for connecting both pipes, after which the frame with the first and the second clamping means and with the welding means is moved along and over the other pipe to the other end of the other pipe for repeating the aforementioned steps for welding the other pipe and a next pipe.

1 Claim, 3 Drawing Sheets

U.S. PATENT DOCUMENTS

| | | |
|---|---|---|
| 4,145,593 A | 3/1979 | Merrick et al. |
| 4,175,224 A | 11/1979 | Sims et al. |
| 4,347,421 A * | 8/1982 | Mukuda et al. ............ 219/60 A |
| 4,545,569 A * | 10/1985 | Schroder et al. .............. 269/43 |
| 4,565,003 A | 1/1986 | McLeod |
| 4,722,468 A | 2/1988 | McClure |
| 4,750,662 A | 6/1988 | Kagimoto |
| 5,052,608 A | 10/1991 | McClure |
| 5,099,098 A * | 3/1992 | Burgoon ................... 219/60 A |
| 5,164,160 A | 11/1992 | Pelletier et al. |
| 5,165,160 A * | 11/1992 | Poncelet ...................... 29/464 |
| 5,685,996 A | 11/1997 | Ricci |
| 5,865,430 A | 2/1999 | Conover et al. |
| 6,325,277 B1 * | 12/2001 | Collie ........................ 228/212 |
| 6,355,899 B1 * | 3/2002 | Kane et al. ................ 219/60 A |

FOREIGN PATENT DOCUMENTS

| | | |
|---|---|---|
| GB | 2249982 | 5/1992 |
| JP | 57168797 | 10/1982 |
| JP | 60178596 | 4/1986 |
| JP | 05192793 | 8/1993 |
| SU | 698743 | 11/1979 |

OTHER PUBLICATIONS

English Abstract of JP 57168797, dated Oct. 18, 1982.
English Abstract of JP 05192793, dated Aug. 3, 1993.
Derwent English Abstract of SU 698473, dated Nov. 28, 1979 (XP 002141503).

* cited by examiner

METHOD AND DEVICE FOR WELDING PIPES

This application is a continuation of application Ser. No. 10/138,024 filed on May 2, 2002 (now U.S. Pat. No. 6,840,433) which is a continuation of International Application PCT/NL00/00792 filed on Nov. 1, 2000, which designated the U.S., claims the benefit thereof and incorporates the same by reference.

FIELD OF INVENTION

The invention relates to a method and a device for welding pipes or tubes to each other for forming pipe lines for instance oil or gas, in which two pipes to be welded to each other are aligned with respect to each other and then a connecting weld is made. The invention particularly relates to welding stationary, lying pipes to each other.

BACKGROUND OF INVENTION

It is known to use a so-called line-up clamp to that end, which clamp is moved within the pipes until on either side of the weld to be formed, and which, at that location, is brought into clamping engagement with the inner surfaces of the ends of the pipes to be welded together. The frame on which the clamping means for both pipes have been arranged provides a rigid orienting means, as a result of which the pipes will be exactly aligned before welding. Such an arrangement is for instance shown in Dutch patent application 90.02396. Here, after orienting the pipes an annular supporting frame for the welding equipment is placed at the outside of the pipes, using a mounting belt arranged earlier on on one of the pipes. For said technique, International patent application WO 95/21721 could also be referred to, in which document a line-up clamp which is mobile within the pipes is described.

The use of a line-up clamp which moves within the pipes requires special provisions, such as long operating lines, the length of which corresponds to the length of the pipe line made ready. Furthermore the line-up clamp has to be retrieved entirely in case it malfunctions. This results in considerable delays in the work.

It is an object of the invention to improve on this.

SUMMARY OF INVENTION

From one aspect the invention to that end provides a method for welding pipes to each other, in which the outer side of the one pipe is engaged tightly with the help of first clamping means and the outer side of the other pipe is engaged tightly with the help of second clamping means, in which the first and second clamping means are kept in line and with their ends close to or against each other by means of a rigid frame on which both clamping means are arranged, after which welding means are operated in order to make a welding seam from the outside for connecting both pipes, after which the frame with the first and the second clamping means and with the welding means is moved along and over the other pipe to the other end of the other pipe for repeating the aforementioned steps for welding the other pipe and a next pipe.

By letting the clamping means for the pipes to be welded together engage at the outside they can always be reached well and can be checked. The operating lines can remain short here, despite the fact that they have to make the movement of the frame possible. Moving the frame over the pipes makes it possible to use the pipes as a guide and a support, as a result of which the frame can be kept simple.

It is noted that from European Patent application 0.119.636 it is known to use a stationary frame for welding vertical pipes to each other, which frame comprises a cage construction with two coaxial sleeves in it for accommodation of the two pipe ends, in which at the outside of the sleeves two clamping jaws acting on the sleeves are provided for fixating the pipes in their positions. The frame is furthermore provided with welding means. After arranging a weld the clamping means are detached and the upper pipe is pushed downward until said pipe and the pipe placed on it are accommodated in their respective sleeves, after which the process can start over again.

Preferably use is made of rollers on or at the frame for engagement of the outer side of the pipes, in which the rollers can be rotated about an axis perpendicular to the centre line of the pipes, in which way a simple guiding and supporting means for the frame on the pipes is used.

Preferably the frame is moved over the pipes by means of driving means provided on the frame, such as a driven roller for instance. External provisions can be kept limited as a result.

Alternatively it is possible to pull the frame on a cable, in which case the frame can remain lightweight and the movement can take place more quickly.

Preferably at least a first connecting weld is made between the pipes by means of welding means that are supported on the frame. Here the frame is used for other purposes, whereas the frame also ensures movement of said welding means, so that no additional measures need to be taken.

In accordance with one embodiment of the invention, there is provided a device for welding a plurality of pipes to each other, said device comprising (a) a rigid frame (100), (b) first (30, 32) and second (31, 33) clamping means supported on the frame for tightly engaging outer sides of respective first (2) and second (3) pipes having respective ends in line with and at a welding distance from each other, each of said first (30, 32) and second (31, 33) clamping means comprising a plurality of circumferentially extending clamping members, (c) movement means on the frame for moving the frame along and over the plurality of pipes while being supported on the pipes, and (d) welding means (80) supported on the frame for welding the plurality of pipes.

In a further development of the method according to the invention, the welding activities are split up, to which end after making the first connecting weld the frame is moved to a next pipe transition, and the weld is finished with the help of external welding means, preferably simultaneously to the movement or the making of the next first connecting weld. The—relatively expensive—line-up part here is used no longer than strictly necessary and it can be used again quickly for a next welding process. The weld connection is sufficiently strong here for holding both pipes together. The weld can be finished with simpler welding means.

From a further aspect the shape of the one pipe is determined with the help of the first clamping means, said shape is stored in a memory as shape data, the second clamping means are brought into engagement with the other pipe and based on the shape data stored in the memory are urged into a position corresponding to the shape stored.

Thus it can be achieved that the contours of the end edges of both pipes have the same shape, so that the weld can be properly arranged and a reliable connection can be laid over the entire circumference. Pipes are usually a little deformed and different as to roundness, which by using the method according to the invention need not have detrimental effects any more, as the shape is now partly adjusted.

It is preferable here that after storing the shape data of the one pipe, the first clamping means are further operated until in a position in which the one pipe is clamped.

Preferably the second clamping means are operated to clamp the other pipe after said deformation movement.

From a further aspect the invention provides the measure that the first and second clamping means are arranged on two respective frame parts, which are connected to each other in an adjustable manner in pipe axis direction, in which the mutual axial distance of the end edges of both pipes is adjusted to the weld shape to be made.

From another aspect the invention provides a device for welding pipes to each other, comprising a rigid frame having first clamping means for tightly engaging the outer side of the one pipe and having second clamping means for tightly engaging the outer side of the other pipe, having its end at welding distance from and in line with the end of the one pipe, and having means for moving the frame along and over the pipes after making the welded joint between the pipes.

Preferably the movement means comprise means for guiding engagement of the outer side of the pipes, which are preferably formed by rollers, for rolling support of the frame on the pipes.

Preferably the device according to the invention comprises welding means supported on the frame, such as in particular a welding robot guidance, and possibly means for welding gas supply and/or a welding wire supply. The service lines towards the device can be kept short and simple as a result. This may result in a largely independent combined aligning and welding device.

Preferably the clamping means comprise a circumferential series of clamping plates which can be radially retracted and extended, for direct engagement of the outer surfaces of the pipes. The division in clamping plates renders a better controllable clamping and aligning possible.

The initial placement is facilitated when the clamping means are arranged for a part of the circumference on a frame part which can be opened with respect to the rest of the frame, in which preferably the part of the frame that can be opened takes up approximately 180 degrees or more of the circumference in circumferential direction. As a result the entire frame can be placed in radial direction around the pipes that are to be welded together. Compared to the known line-up clamp that can be moved within the pipes and the aforementioned known welding device that works with clamping sleeves, the advantage is obtained that bringing the device to its destined place does not need much movement along the first pipe.

Preferably the frame is provided with, preferably hydraulic, operating means for moving the frame parts that can be opened.

In an advantageous manner the frame that is situated outside around the pipes can be used for an additional function, in that sense that the frame is furthermore provided with a wind shield for screening off the welding area radially to the outside.

Preferably the frame is furthermore provided with a longitudinal shell or structure extending in pipe centre line, which preferably has a circumference of 180 degrees or less. Said structure or said longitudinal shell can be advantageous for the aligning and for the movement of the frame, as well as for the support of the parts for the operation and drive of the parts of the device. It is advantageous here when the longitudinal shell or structure is provided with supporting or guidance rollers, which preferably in pipe centre line direction are in line with each other like several rollers.

The aligning and guidance is promoted when several sets of rollers are present which are spaced apart in circumferential direction.

Preferably the first and the second clamping means are arranged on different frame parts, that are connected to each other by means of connection means that can be adjusted in axial direction, preferably (hydraulic) cylinders, in order to be able to adjust the position of the end edges to the desired position for the weld.

From a further aspect the device comprises means for operating the first clamping means, means for determining an abutment position of the first clamping means, means for storing the abutment position in a memory, means for operating the second clamping means, in which the means for operating the second clamping means are connected to the control means for moving the second clamping means to a position corresponding to the abutment position, based on the abutment position as stored in the memory.

Preferably the means for operating the first clamping means and the means for operating the second clamping means are adapted for urging the clamping means from the abutment position to a clamping position.

BRIEF DESCRIPTION OF THE DRAWINGS

The invention will be elucidated below on the basis of an exemplary embodiment shown in the attached drawing, in which.

DETAILED DESCRIPTION

Figure 1:
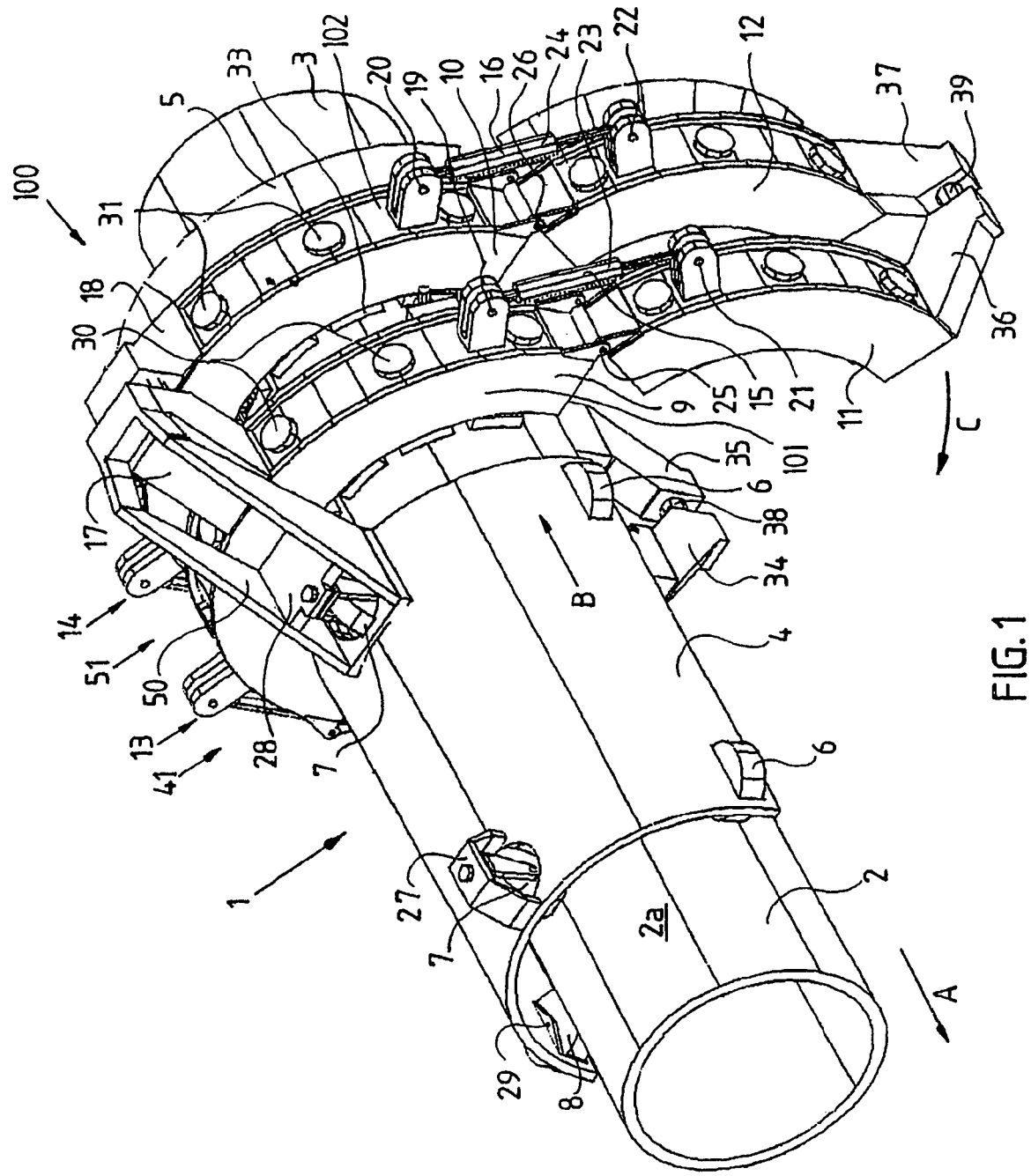
FIG. 1 shows a view in perspective on a device according to the invention, in a partly opened position.
Figure 2:
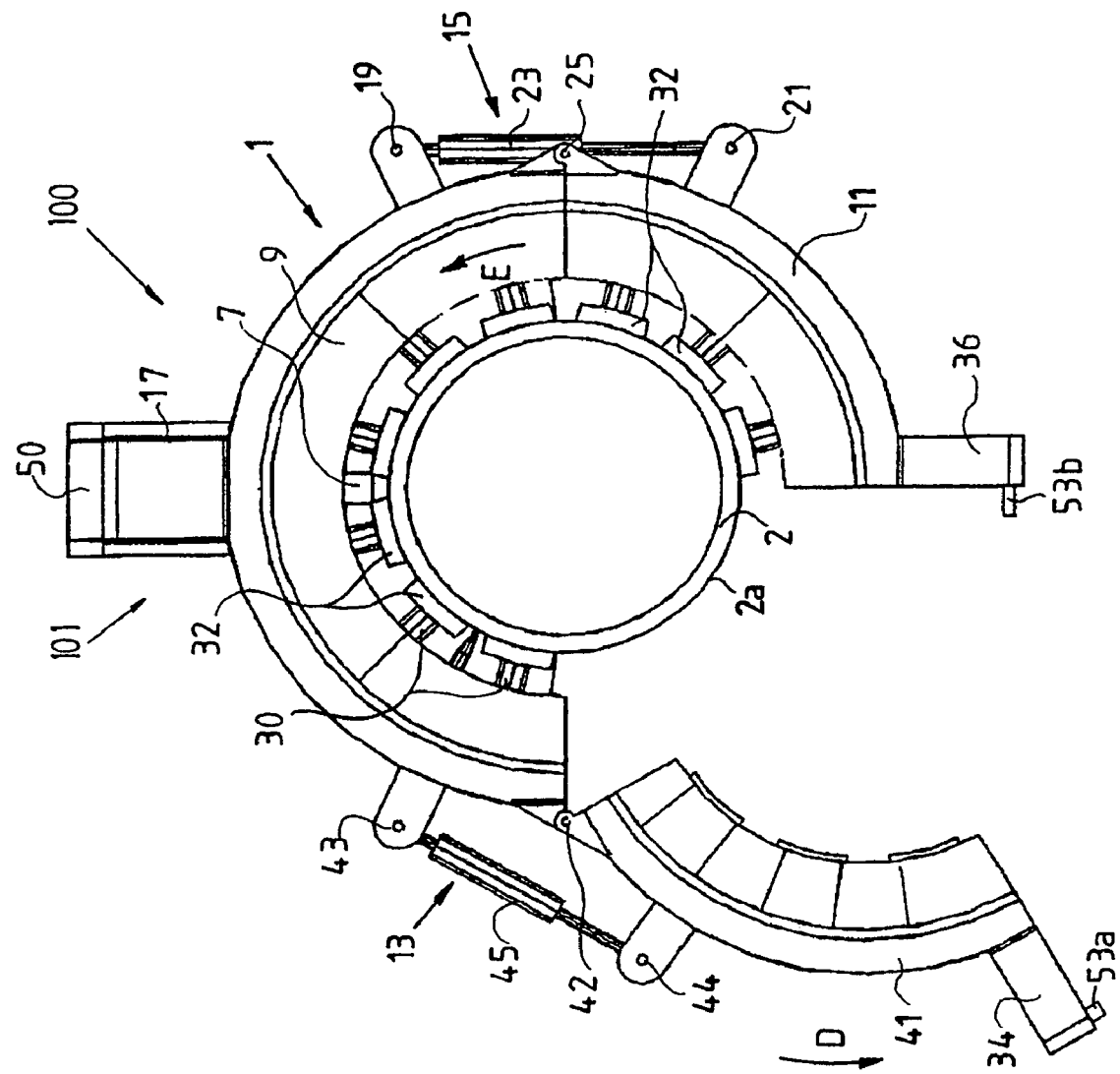
FIG. 2 shows an end view on the device of FIG. 1, in another position.

The aligning device 1 of the FIGS. 1 and 2 is used for aligning the pipes 2 and 3, which are situated with their end edges near each other. The pipes 2 and 3 are here supported by means that are not further shown, the pipe 2 for instance on blocks or a mound of soil, the pipe 3 hanging from a crane or also on a mound of soil. The part of the pipe line that is ready extends in the direction A.

The device 1 comprises a frame 100. The frame is substantially formed by two rings 101 and 102, in which clamping shoes 32 and 33, respectively, have been arranged in a radially extendable and retractable manner, in which in FIG. 1 the ends of the radially movable jacks 30 and 31, respectively, of the clamping shoes 32 and 33, respectively, can be seen.

The main parts of the rings 101 and 102 are semi-circular brackets 9 and 10, which at their ends are hingedly connected to bracket segments 11, 12 and 41, 51 by means of hinged joints 25, 26 and 42 (see FIG. 2: it will be understood that the bracket 10 is designed substantially identical to bracket 9). The bracket segments 11, 12 and 41, 51 are moreover connected to the brackets 9 and 10 by means of hydraulic cylinder assemblies 13, 14, 15, 16, and namely by means of hinged attachments 19, 20, 43 on the brackets 9 and 10, hinged joints 21, 22 and 44 on bracket segments 11, 12 and 41, 51 and cylinders 23, 24 and 45 attached in between them. Bracket segment 51 corresponds to bracket segment 41.

As can be seen in FIG. 2 the clamping shoes 32, 33 form series running in circumferential direction.

The frame 100 is further provided with supports 17 and 18 extending radially and axially from the brackets 9 and 10, which supports are connected to each other by means of cylinders 52a, 52b in a rigid, though axially adjustable manner. In a comparable manner supports 36, 37 and 34 and 35, respectively, extend from the bracket segments 11, 12 and 41, 51, which supports are connected to each other by means of cylinders 39 and 38 in the same manner as the supports 17 and 18.

Furthermore attached to the frame is a relatively long, semi-circle cylindrical shell 4 to the already part of the pipe line (which shell is short enough, however, to be able to traverse the bends of the pipe line) and a relatively short funnel 5 extending around the pipe 3, which funnel for that matter is divided. The shell 4 can also be formed like an open structure, such as a lattice structure. The shell 4 can be provided with running/supporting wheels 6, 7 and 8, with which the device 1 is supported on the pipes 2 and 3 and can be moved over it in the direction B. In this case the wheels or rollers 6 and 8 can rotate freely, to which end, as shown for the rollers/wheels 6 and 8, suspensions 27 and 29 have been provided. The rollers 7 are driven by means of a drive supported on the shell 4, which drive is not shown, and are bearing mounted in trestles 27. An active control can be provided for the rollers 7. A roller can furthermore be coupled to an inclinometer. Finally the exemplary embodiment 1 shown, according to the invention is provided with a bracket 50 which is attached to both the shell 4 and the frame and connects them to each other, from which bracket the device can be suspended during its placement and removal and by means of which the device 1 can be pulled in the direction B. Apart from the bracket 50 no constructive connection is necessary between the shell 4 and the frame 100.

Figure 3:
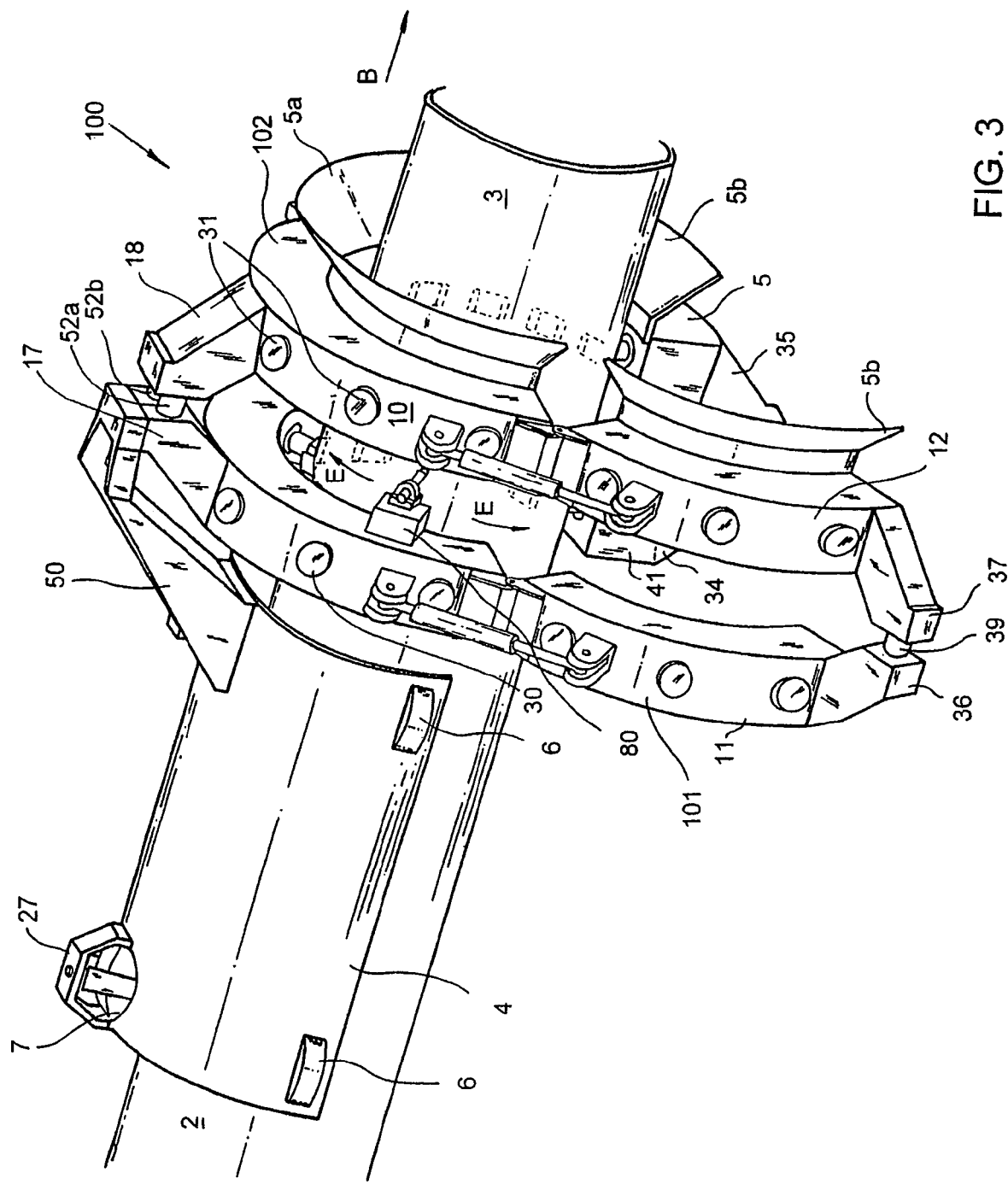
FIG. 3 shows a view in perspective on the device of FIG. 1, however from another side.

The bracket assemblies 9, 10, 11, 12, 41, 51 assembled in the manner of FIG. 1, form as it were one frame and are moreover able to offer room to welding means, such as a guide for a welding robot extending in circumferential direction, the welding robot itself (see 80 in FIG. 3), gas supply means, wire supply means etc. Moreover the frame or shell 4 can offer room to driving means for the cylinders 23, 24, 45 and so on and for the clamping shoes 32 and 33 that are provided on the brackets and the bracket segments.

Furthermore a control and regulation unit (not shown) has been arranged on the frame 100 or on the shell 4, with which unit the various parts can be operated and controlled. Said unit particularly comprises a measuring device for determining the position of the clamping shoes 32 and 33, in particular at abutment against the wall of the pipe concerned, and storing said position in the memory.

When the pipes 2 and 3 have to be welded to each other with their ends, the device 1 is lowered on the bracket 50, until the wheels or rollers 6, 7, 8 find support on the outer surfaces of the pipes 2 and 3, such as outer surface 2a of pipe 2 (see FIG. 2). In this way the device 1 is also somewhat centred with respect to the pipe 2. The pipe 3 is then still hanging from a crane. Subsequently the cylinders 23, 24, 45 are activated to urge the bracket segments 11, 12, 41, 51, according to rotation movements C and D, from the opened position into the closed position, for bracket 11 shown in FIG. 2. Subsequently a tangential coupling is made with the help of couplings 53a, 53b between the supports 34 and 36 that are near each other, and the same for the other supports 35 and 37, so that an as it were continuous ring bracket is created. The funnel 5 here helps as orienting means for the pipe 3 hanging from the crane, which after that can be supported by placing a mound of soil under the pipe 3.

Subsequently the jacks 30 are operated to let the shoes 32 abut the outer surface of the pipe 2. Said position, which corresponds to the degree of radial expansion of the jacks in question, is noticed by the aforementioned measuring device, and on the basis thereof a contour sketch is made and stored in a memory. Subsequently the jacks 30 are driven to let the shoes 32 clamp the pipe 2.

The jacks 31 are then driven to bring the shoes 33 against the outer surface of the pipe 3 and subsequently move it to a position corresponding to the position as determined by the measuring device for the corresponding shoes 32, in order to obtain an identical contour sketch, by deforming the wall of the pipe 3 where necessary. When the contour of pipe 3 is already sufficiently of the same shape as pipe 2, adjustment of pipe 3 is of course unnecessary. The jacks 31 are subsequently driven to let the shoes 33 clamp the pipe 3 entirely, so that the pipes 2 and 3 are now both clamped and, as it were, form a unity with the frame 100 and as a result are fixed radially with respect to each other, in line with each other. It is noted that the jacks are adapted for generating sufficiently large clamping and deformation forces, such as for instance 3-4 tons.

Subsequently the hydraulic cylinders 38, 39, 52a and 52b are operated to bring the end edges of the pipes 2 and 3 at the wanted distance from each other for making the weld. In case of a V-seam a little distance is necessary, but in case of a J-seam not. When the wanted distance is reached the cylinders are fixed/secured in their expansion.

The aligning device 1 has been installed then and applying the welded joint can be started with the help of welding robot 80, which is moved in the circumferential direction E. With the device according to the invention adjustment can take place with such precision that for welding also laser welding methods can be used.

It is advantageous when welding to weld the pipes 2 and 3 to each other such that they are connected to each other in a movement fixed manner, to move the device 1 to a next welded joint to be made and to simultaneously finish the weld between pipes 2 and 3 with other welding means.

When the pipe line in question is completed, the device 1 need not be moved to a location where it can be driven from the last pipe, but the bracket segments can simply be opened again and the device 1 can be hoisted away.

The invention claimed is:

1. A device for welding a plurality of pipes together, said device comprising:
   (a) first and second rings, said first and second rings comprising respective first and second clamping means for tightly engaging outer sides of respective first and second pipes having respective ends in line with and at a welding distance from each other, each of said first and second rings being disposable in either (i) a clamping position with the first or second clamping means tightly engaging outer sides of the respective first or second pipes or (ii) a non-clamping position with the first and second clamping means not tightly engaging the outer sides of the respective first or second pipes, each of said first and second clamping means comprising a plurality of first and second clamping members,
   (b) support means for connecting the first ring to the second ring to form a frame, said support means extending axially and radially outward from respective outer surfaces of the first and second rings;
   (c) movement means on the frame for moving the frame along and over the plurality of pipes while being supported on the pipes; and
   (d) welding means supported on the frame for welding the plurality of pipes, said welding means being movable along the frame in a circumferential direction, said first and second rings, connection means and movement means being assembled to allow such movement.

* * * * *